(12) United States Patent
Foutch

(10) Patent No.: US 10,041,443 B2
(45) Date of Patent: Aug. 7, 2018

(54) THRUST REVERSER APPARATUS AND METHOD

(71) Applicant: The Boeing Company, Chicago, IL (US)

(72) Inventor: David W. Foutch, Seattle, WA (US)

(73) Assignee: The Boeing Company, Chicago, IL (US)

( * ) Notice: Subject to any disclaimer, the term of this patent is extended or adjusted under 35 U.S.C. 154(b) by 408 days.

(21) Appl. No.: 14/734,298

(22) Filed: Jun. 9, 2015

(65) Prior Publication Data

US 2016/0363097 A1    Dec. 15, 2016

(51) Int. Cl.
*F02K 1/70* (2006.01)
*F02K 1/72* (2006.01)
(Continued)

(52) U.S. Cl.
CPC .................. *F02K 1/70* (2013.01); *F02C 7/24* (2013.01); *F02K 1/72* (2013.01); *F02K 1/763* (2013.01);
(Continued)

(58) Field of Classification Search
CPC ..... F02K 1/09; F02K 1/32; F02K 1/62; F02K 1/625; F02K 1/60; F02K 1/605;
(Continued)

(56) References Cited

U.S. PATENT DOCUMENTS

| 3,815,357 A | 6/1974 | Brennan |
| 4,005,822 A | 2/1977 | Timms |

(Continued)

FOREIGN PATENT DOCUMENTS

| DE | 102012002885 A1 | 8/2013 |
| DE | 102013206595 A1 * | 10/2014 |

(Continued)

OTHER PUBLICATIONS

Machine Translation of DE102013206595A1.*
(Continued)

*Primary Examiner* — Phutthiwat Wongwian
*Assistant Examiner* — Loren Edwards
(74) *Attorney, Agent, or Firm* — Miller, Matthias & Hull LLP

(57) ABSTRACT

A thrust reverser is adapted to be fixed within a turbofan engine nacelle that extends substantially about an engine core cowl. The nacelle and engine core cowl together define an axially extending annular duct for receiving an aft flowing fan bypass air stream that is forwardly redirected upon deployment of the thrust reverser. The nacelle includes an axially translating sleeve, circumferentially arranged translating cascade sets, and axially translatable blocker doors adapted to pivot radially inwardly from the translating sleeve to extend at least partially into the fan bypass air stream. A blocker door deployment drag linkage is pivotally coupled to each of the translating sleeve and the blocker doors. When stowed, an axially extending outer wall of the bypass duct is radially interposed between each blocker door and the fan bypass air stream to assure that the blocker doors remain entirely concealed from the fan bypass air stream.

18 Claims, 4 Drawing Sheets

(51) Int. Cl.
  *F02K 1/82* (2006.01)
  *F02C 7/24* (2006.01)
  *F02K 1/76* (2006.01)

(52) U.S. Cl.
  CPC .............. *F02K 1/766* (2013.01); *F02K 1/827* (2013.01); *F05D 2260/50* (2013.01); *F05D 2260/96* (2013.01); *Y02T 50/671* (2013.01)

(58) Field of Classification Search
  CPC ... F02K 1/566; F02K 1/64; F02K 1/70; F02K 1/72; F02K 1/763; F02K 1/766; F02K 1/827; F02C 7/24; F05D 2260/50; F05D 2260/96
  USPC .......................................................... 60/230
  See application file for complete search history.

(56) References Cited

U.S. PATENT DOCUMENTS

| | | | |
|---|---|---|---|
| 4,564,160 A | 1/1986 | Vermilye | |
| 5,228,641 A | 7/1993 | Remlaoui | |
| 5,987,880 A * | 11/1999 | Culbertson | F02K 1/70 239/265.37 |
| 7,559,507 B2 | 7/2009 | Harrison et al. | |
| 2013/0205753 A1* | 8/2013 | Todorovic | F02K 3/025 60/226.2 |
| 2013/0284822 A1* | 10/2013 | Howarth | F02K 1/70 239/11 |

FOREIGN PATENT DOCUMENTS

| | | |
|---|---|---|
| DE | 102013206595 A1 | 10/2014 |
| EP | 1843031 A1 | 10/2007 |
| GB | 1276265 A | 6/1972 |
| WO | 2015019007 A1 | 2/2015 |

OTHER PUBLICATIONS

European Search Report related to Application No. 16 169757 dated Jan. 19, 2017.
Search Report for related European Application No. EP16169757.8; report dated Oct. 24, 2016.
European Search Report related to Application No. 16169757.8; Report dated Apr. 4, 2018.

* cited by examiner

THRUST REVERSER APPARATUS AND METHOD

FIELD

The present disclosure relates generally to aircraft, and more particularly to a thrust reverser apparatus configured for use on aircraft.

BACKGROUND

Various control devices are used to effectively and efficiently maneuver aircraft during various phases of flight. Some control devices are directly attached to wings of aircraft, such as ailerons adapted for controlling "roll", i.e. rotational movement of an aircraft about its longitudinal axis. Spoilers may also be directly attached to aircraft wings to rapidly reduce wing lift when and as desired, particularly during various descent phases of a flight. Flaps are typically attached directly to the wings to change their aerodynamic shapes for assuring stable flight control during slower speeds, such as during takeoff and landing.

Upon landing of a commercial jet aircraft, some form of thrust reverser is generally deployed immediately after actual touchdown to reduce rolling groundspeed to a point where landing gear wheel braking becomes effective. In jet aircraft having engines mounted on the rear or tail end of the empennage, a two-piece clam-style thrust reverser is typically deployed from the engine exhaust outlet to direct exhaust thrust forwardly for retarding groundspeed. In turbofan jet aircraft having wing-mounted engines, the thrust reverser is typically situated within an annular bypass air duct situated between the engine and engine nacelle, in the form of a circumferential ring of blocker doors attached to linkage configured to deploy the doors into the duct.

Several challenges have been presented by the latter bypass duct thrust reversers, including ongoing efforts to reduce and/or minimize their burdensome weight and excrescence drag penalties.

It is therefore desirable to provide improved thrust reversers, along with thrust reverser components, that accommodate ever increasing aircraft efficiency and performance demands. Such components, for example the blocker doors and their deployment mechanisms, should be lighter in weight, ideally possess enhanced functionality such as allowing for more noise abatement surface area, and yet maintain required strength and robustness in the face of increasingly stringent design targets.

SUMMARY

In accordance with one aspect of the present disclosure, a thrust reverser for a turbofan engine, including an engine core and a nacelle defining an axially extending bypass duct for receiving a fan bypass air stream, includes an axially translating sleeve movably coupled to a fixed portion of the nacelle and thereby to the engine fan case. Blocker doors having an axial orientation when in a stowed position are pivotally coupled to the translating sleeve. An outer wall of the bypass duct is radially interposed between the blocker doors and the fan bypass air stream when the blocker doors are the stowed position.

In accordance with another aspect of the present disclosure, a first end of each blocker door is coupled to the translating sleeve at a first pivot joint, and each blocker door is configured to pivot radially inwardly about the first pivot joint to a deployed position in which the blocker door is disposed at least partially in the fan bypass air stream.

In accordance with another aspect of the present disclosure, a drag linkage is coupled to each blocker door at the second pivot joint fixed at an intermediate location along a length of each blocker door.

In accordance with yet another aspect of the present disclosure, a blocker door brake is configured to prevent rotation of the blocker door about the second pivot joint when the blocker door brake is engaged.

In accordance with a still further aspect of the present disclosure, another embodiment of the disclosed thrust reverser has sets of dual blocker doors and eliminates the need for cascade sets, while also providing a radially interposed axially extending outer wall of the annular bypass duct between the blocker doors and the fan bypass air stream when the thrust reversed has been stowed.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated only schematically. It should be further understood that the following detailed description is merely exemplary, and not intended to be limiting. As such, although the present disclosure is, for purposes of explanatory convenience, depicted and described in only the illustrative embodiments presented, the disclosure may be implemented in numerous other embodiments, and within various other systems and/or environments neither shown nor described herein.

DETAILED DESCRIPTION

The following detailed description is intended to provide both apparatus and methods for carrying out the disclosure. Actual scope of the disclosure is as defined by the appended claims.

Figure 1:
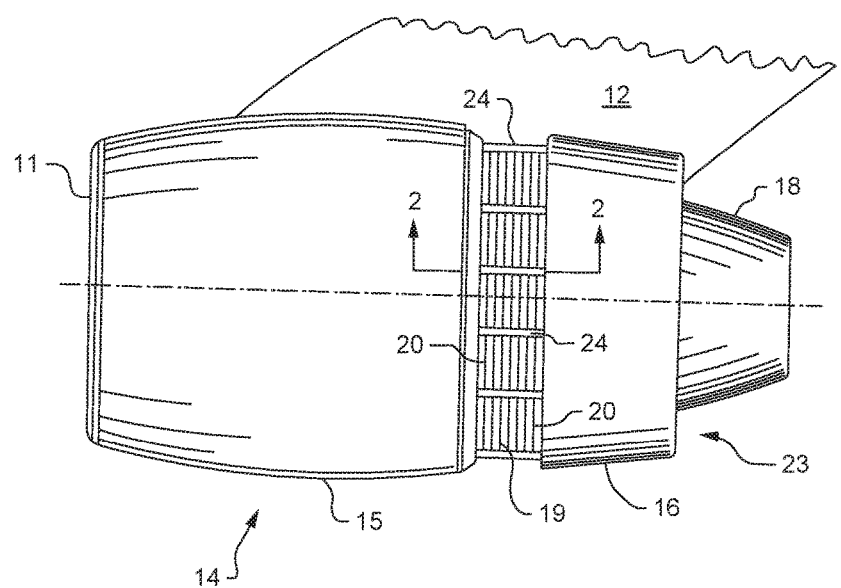
FIG. 1 is a schematic side view of a turbofan engine nacelle, of a type utilized on a commercial aircraft that may incorporate a thrust reverser configured in accordance with this disclosure, showing the thrust reverser in its fully deployed position.

FIG. 1 is a schematic view of a turbofan nacelle 14 secured to a turbofan engine (not shown) attached to a pylon 12 of a type typically supported from an aircraft wing (not shown). The turbofan engine (hidden) is enclosed by the nacelle 14. The nacelle 14 includes a fixed portion 15, and a translating sleeve assembly 16, configured to uncover a series of translating cascade sets 20, each of which includes a plurality of forwardly-directed vanes 19 configured to provide reverse thrust. Reverse thrust, as typically desirable immediately upon touchdown, is achieved by the vanes 19, which are angled to redirect air passing through an axially extending bypass duct 22 (FIG. 2) in a forward direction to reverse the otherwise aft movement of a fan bypass air stream 32 (FIG. 2) to be described.

The plurality of cascade sets 20 are circumferentially arranged as spaced islands that define spaces 24 between adjacent cascade sets 20. Collectively, the cascade sets 20 essentially form a circumferential "cascade basket", and within one or more of each space 24 is situated a telescopically extensible and retractable (or collapsing) first and second hydraulic cylinders 25, 26 (FIG. 2), configured to deploy a thrust reverser 28 both axially and radially into the bypass duct 22, as will be described herein.

Figure 2:
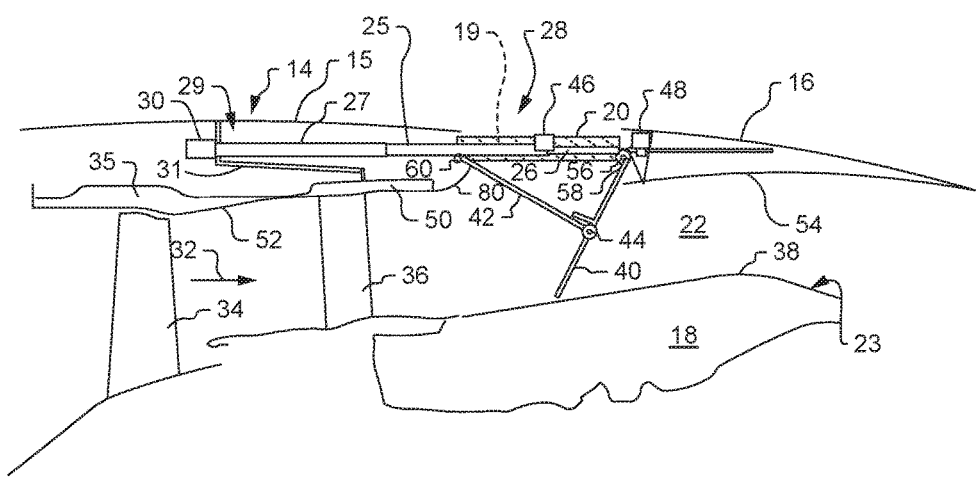
FIG. 2 is a schematic side view taken along lines 2-2 of FIG. 1, depicting the disclosed thrust reverser in its fully deployed position.

Referring now particularly to FIG. 2, an actuation system 29 can be used for moving the thrust reverser 28 between stowed and deployed positions. In the view of FIG. 2, the thrust reverser is shown fully deployed. The actuation system 29 includes actuator heads 30, fixed to a conic structure 31, which in turn is fixed to a forward fixed portion 15 of the nacelle 14. The conic structure 31 also interfaces with an outer wall 50 of the annular-shaped bypass duct 22 through a V-blade/V-groove arrangement (not shown). A non-telescoping base cylinder 27 is directly affixed to each actuator head 30 for receiving the first and second retractable cylinders 25, 26 in a nested configuration when retracted, as will be appreciated by those skilled in the art. As disclosed, the actuation system 29 includes at least the actuator head 30, its associated base cylinder 27, and telescoping cylinders 25, and 26.

To the extent that a substantial portion of the thrust of the turbofan engine is created by a fan bypass air stream 32 (shown as an arrow), a plurality of fan blades 34 (only one of which is shown) forces the fan bypass air stream 32 through the bypass duct 22. The fan bypass air stream 32 passes from the fan blades 34 through stator vanes 36, for assuring desired directional control of the fan bypass air stream 32. A fan blade containment ring 35, situated about the periphery of the fan blades 34 and comprising a portion of a forward fan case 52, is configured to minimize risk of any failed fan blade parts or pieces actually separating from the turbofan engine and piercing through and escaping the nacelle 14.

Figure 3:
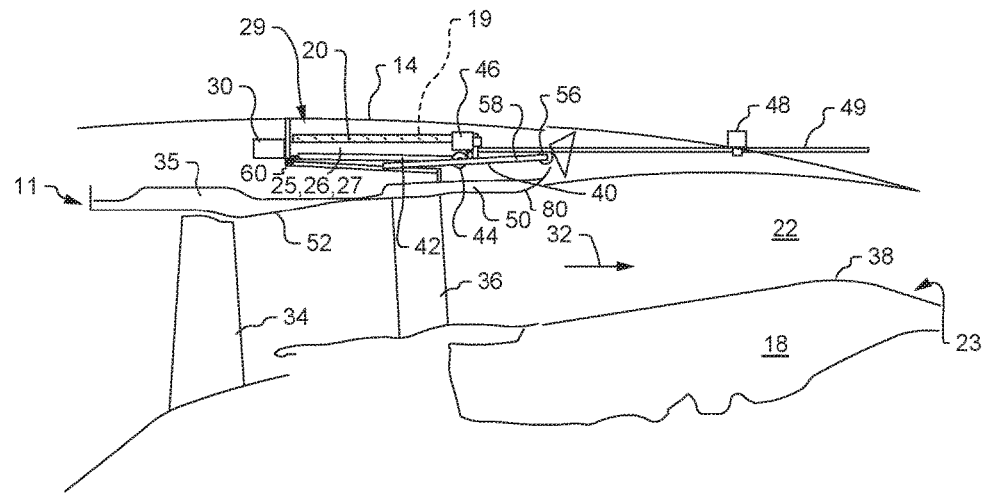
FIG. 3 is a schematic side view similar to that of FIG. 2, but with the disclosed thrust reverser depicted in its fully stowed position, both removed and concealed from a turbofan bypass duct and associated air flow, respectively.

Referring now also to FIG. 3, during normal flight operations the thrust reverser is stowed. The fan bypass air stream 32 enters the bypass duct 22 at the front 11 (FIG. 1) of the nacelle 14, being pulled vigorously through the fan blades 34 past the stator vanes 36, and along an axially oriented path for exit through the rear 23 of the bypass duct 22. Accordingly, in this disclosure all directional references to forward and aft structures will be from front 11 to rear 23, respectively.

Immediately after a normal touchdown, the thrust reverser 28 may be fully deployed to the position shown in FIG. 2, in which blocker doors 40 physically redirect the fan bypass air stream 32 into a circumferentially outward direction through the cascade sets 20 to produce the described reverse thrust effect. At such time, the blocker doors 40 serve to block the bypass air stream 32 from exiting the rear 23 of the bypass duct 22, as otherwise occurs during normal flight.

As noted, deployment of the thrust reverser 28 is initiated via the actuation system 29, which is fixed to the nacelle 14 and to the translating sleeve assembly 16. The actuation system 29 is configured to extend the translating sleeve assembly 16 axially from a fully stowed position to a fully deployed position, and to alternately retract the translating sleeve assembly 16 from a fully deployed position to a fully stowed position. To achieve such functionality, the actuation system 29 causes each actuator head 30 to extend its respective retractable hydraulic cylinders 25, 26, in turn translating axially rearward the cascade sets 20 and the blocker doors 40, along with associated drag linkage 42 by which the blocker doors are pivotally connected to the cascade sets 20, as further described below. When the thrust reverser 28 is in a fully deployed state (FIG. 2), the blocker doors 40 are completely extended and angled radially inwardly to contact, or come into close proximity with, the circumferential exterior 38 of a jet engine core cowl 18 as shown, to block the fan bypass air stream 32 from exiting through the rear 23 of the duct 22 as earlier noted.

Figure 4:
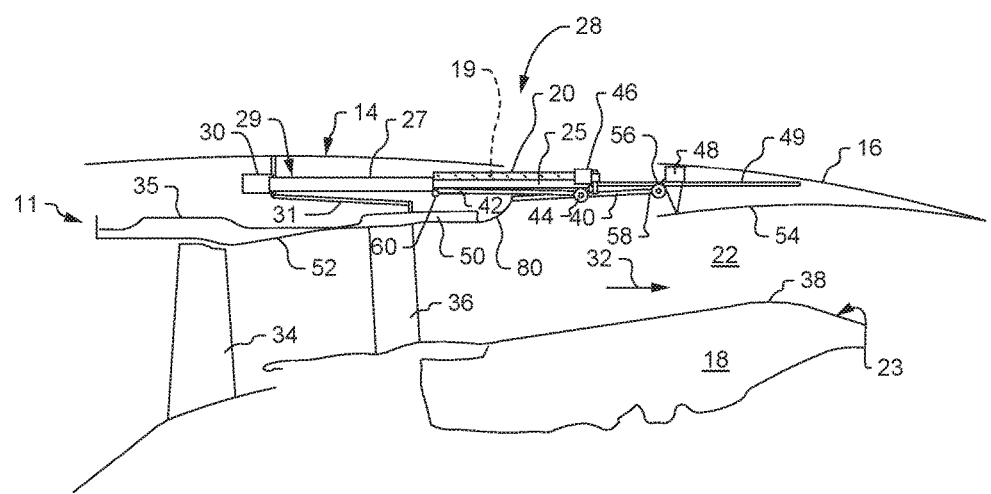
FIG. 4 is a schematic side view similar to that of FIGS. 2 and 3, but with the disclosed thrust reverser depicted in an intermediate position; i.e. between fully deployed and fully stowed positions of FIGS. 2 and 3, respectively.

Referring now particularly to FIGS. 3 and 4, the various components of the thrust reverser 28 and their interactions are now more fully described. As earlier noted, the thrust reverser 28 is shown in a fully stowed position in FIG. 3, as contrasted to FIG. 2 in which the thrust reverser 28 is shown in its fully deployed position. In the fully stowed position of FIG. 3, all noted components of the thrust reverser 28, including the cascade sets 20 and the hydraulic cylinders 25, 26, are shown in their retracted states. As also earlier noted, each of the telescoping cylinders 25, 26 is retracted into its associated non-telescoping base cylinder 27, each of the latter being rigidly fixed to one of the actuator heads 30. In the stowed position, all blocker doors 40 and associated deployment drag linkages 42 are locked in position behind the outer wall 50 of the bypass duct 22, as shown. Since the outer wall 50 is radially interposed between the noted components and the fan bypass air stream 32, the thrust reverser 28 is fully shielded, and indeed concealed, from any portion of the bypass air stream 32. This feature acts to decrease excrescence drag.

Providing the outer wall 50 to shield the blocker doors 40, rather than have the blocker doors 40 themselves be used as part of the bypass duct 22 during normal flight to control the bypass air stream 32 serves to provide a more dedicated noise abatement surface area, to the extent that the blocker doors per se cannot efficiently offer such surface area, as those skilled in the art will appreciate. As such, an interior wall 54 of the translating sleeve assembly 16 may be formed with apertures, perforations, and/or otherwise treated with known acoustical dampening materials to facilitate compliance with noise abatement protocols.

A first phase of thrust reverser deployment involves its movement from the stowed position shown in FIG. 3 to the intermediate position shown in FIG. 4. The hydraulic actuator system 29 actuates each actuator head 30 to first extend the first hydraulic cylinder 25 associated with that respective head 30, causing the cascades 20, blocker doors 40, drag linkages 42, and the translating sleeve assembly 16, to all move axially aft or rearward. For this action, one or more blocker door brakes 46 and one or more track locks 48, are operated as follows.

With the thrust reverser in the position shown in FIG. 3, and prior to deployment of the thrust reverser, both the blocker door brake 46 and the track lock 48 are engaged. The track lock, when engaged, prevents the translating sleeve assembly 16 from moving along a slider track 49. A blocker door brake 46, when engaged, holds the drag linkage 42 to the cascade 20, thereby preventing motion of the drag linkage 42 that would deploy the blocker door 40 radially inward.

To initiate deployment of the thrust reverser from the stowed position shown in FIG. 3, the track lock 48 is first released to initiate deployment of the thrust reverser 28 from the stowed position. After release of the track lock 48, the actuator heads 30 then move the translating sleeve assembly 16, together with the cascades 20, blocker doors 40 and drag linkages 42, aft or rearward via the extension of the first hydraulic cylinder 25, as shown in FIG. 4 during the initial phase of thrust reverser deployment. Upon completion of the initial extension of the hydraulic cylinder 25, the track lock 48 is then engaged, i.e. locked. This completes the first phase of the thrust reverser deployment.

A second phase of the thrust reverser deployment involves releasing the blocker door brake 46, and extending the second hydraulic cylinder 26, causing the cascades 20 to move further aft and to cause deployment of the blocker doors 40 into the bypass duct 22 (as shown in FIG. 2).

For permitting deployment of the blocker doors 40 into the fan bypass air stream 32, three separate pivot joints 56, 60, 44 allow each drag linkage 42 and associated blocker door 40 to move from positions shown in FIG. 4 to their respective positions shown in FIG. 2. The pivot joint 56 is affixed to the aft end 58 of each blocker door 40 and to the translating sleeve assembly 16. The pivot joint 60 is affixed to the forward end of each drag linkage 42 and to the forward end of the cascade 20. The pivot joint 44 is located approximately midway along the blocker door 40 and is affixed to the blocker door 40 and to the drag linkage 42.

As such, the second phase of the thrust reverser deployment is initiated by releasing the blocker door brake. The thrust reverser actuator system 29 then causes each actuator head 30 to extend each second hydraulic cylinder 26. The aft end of each second hydraulic cylinder 26 is affixed to an end of a cascade 20. When each second hydraulic cylinder 26 extends, it causes its associated cascade 20 to move along its associated slider track 49. This motion also simultaneously causes the forward portion of each drag linkage 42 to pivot about its pivot joint 60, the aft portion of the drag linkage 42 to pivot about its pivot joint 44, and the aft end 58 of each blocker door 40 to pivot about its pivot joint 56. In other words, the pivot joints 56, 60 and 44, cooperating together with the drag linkage 42, the blocker door 40 and the cascade 20, all move on a respective slider track 49 from positions shown in FIG. 4 to their respective positions in FIG. 2, via extension of the second hydraulic cylinder 26. When the second hydraulic cylinder 26 is fully extended, the second phase of the thrust reverser deployment is complete, and the thrust reverser is in its fully deployed position, with the blocker doors 40 blocking the bypass duct 22, causing the bypass duct airflow 32 to be diverted through the cascades 20.

Figure 5:
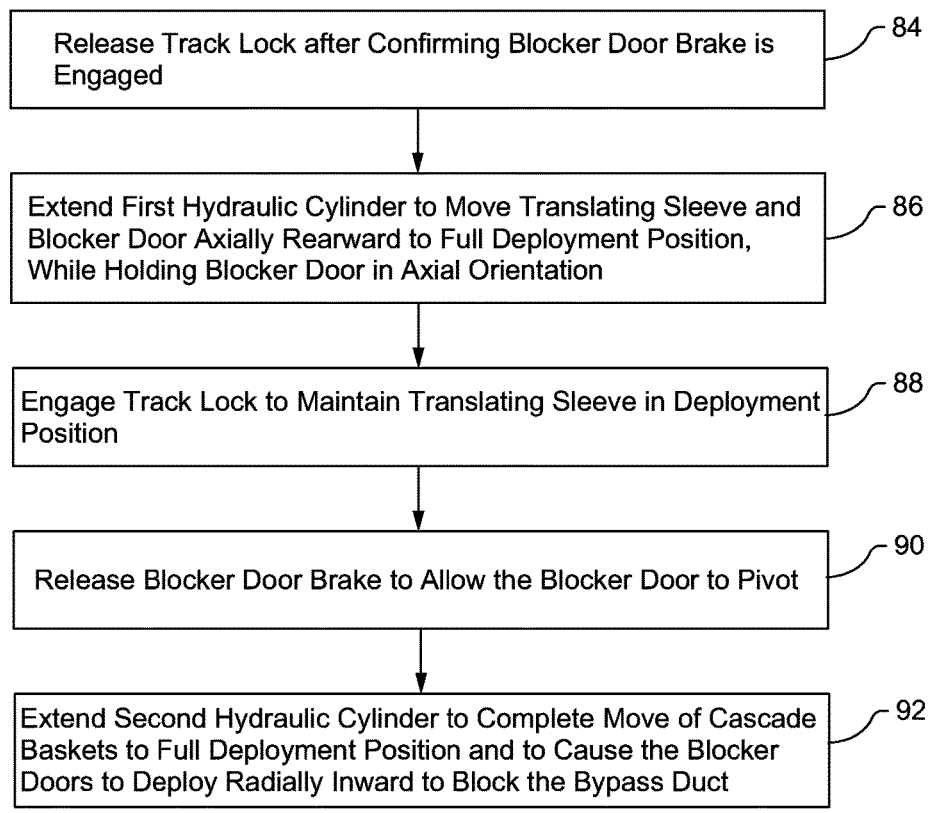
FIG. 5 is a flowchart depicting an exemplary deployment sequence of one embodiment of the present disclosure.

FIG. 5 is a flowchart depicting a deployment sequence for the described embodiment of the thrust reverser 28, including steps as referenced below:
84 Release Track Lock, et seq.
86 Extend First Hydraulic Cylinder, et seq.
88 Engage Track Lock, et seq.
90 Release Blocker Door Brake, et seq.
92 Extend Second Hydraulic Cylinder, et seq.

Retraction of the thrust reverser 28 is also initiated by the actuator system 29, which causes each actuator head 30 to retract each second hydraulic cylinder 26, causing the blocker doors 40 to retract radially out of the fan bypass air stream 32, similar to the action of an umbrella being collapsed and folded inwardly toward its telescopically retractable handle. Once the blocker doors 40 have been retracted from the bypass air stream 32 (FIG. 4), the blocker door brake 46 is engaged again, the track lock 48 is released, and each first hydraulic cylinder 25 retracts forwardly, in turn pulling the cascade sets 20 and translating sleeve assembly 16 forwardly into their fully stowed positions, shown in FIG. 3. Upon full retraction, the track lock 48 is selectively engaged, wherein the thrust reverser 28 is then fully and securely stowed. When fully stowed (FIG. 3), the interior wall 54 of the translating sleeve assembly 16 abuts a bullnose 80, completely concealing the entire thrust reverser 28, including all of its components, from the fan bypass air stream 32.

Figure 6:
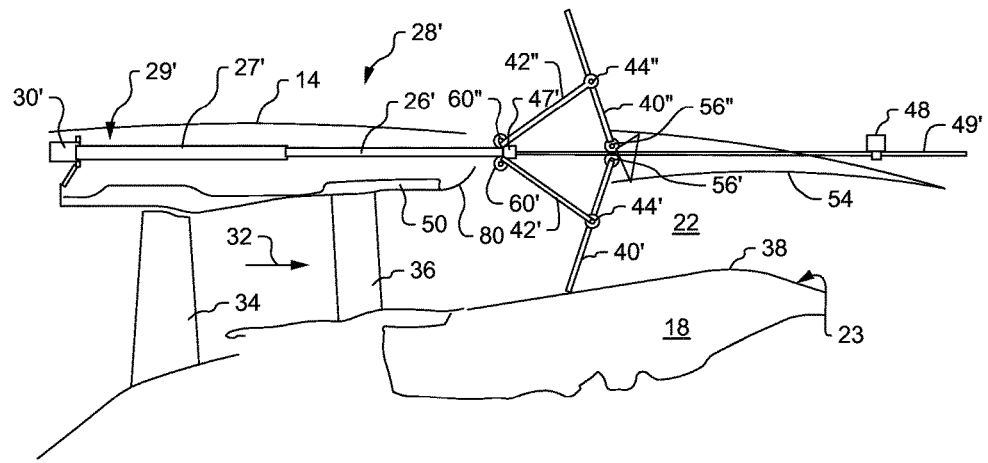
FIG. 6 is a schematic side view of an alternate embodiment of the disclosed thrust reverser, shown in a fully deployed position.

Referring now to FIG. 6, an alternate embodiment of a thrust reverser 28' utilizes a circumferential array of dual blocker doors 40' and 40", shown schematically in a fully deployed state. In this embodiment, the cascade sets 20 of the previously described embodiment are not included, as they are not required. Instead, dual sets of the blocker doors 40', 40" are pivotally connected together via dual pivot joints 56' and 56" to create reverse thrust without such cascade sets. Upon deployment, the circumferentially arranged blocker doors 40', 40" are opened as shown to form a clam-shell style thrust reversing mechanism that also effectively interfaces with the bypass duct 22 to provide the reversing function. In this embodiment, the base cylinder 27' contains only one telescoping hydraulic cylinder 26' for deployment of the dual blocker doors, which are each pivotal about respective pivot joints 60' and 60" on the aft end of the hydraulic cylinder 26', as shown.

Figure 7:
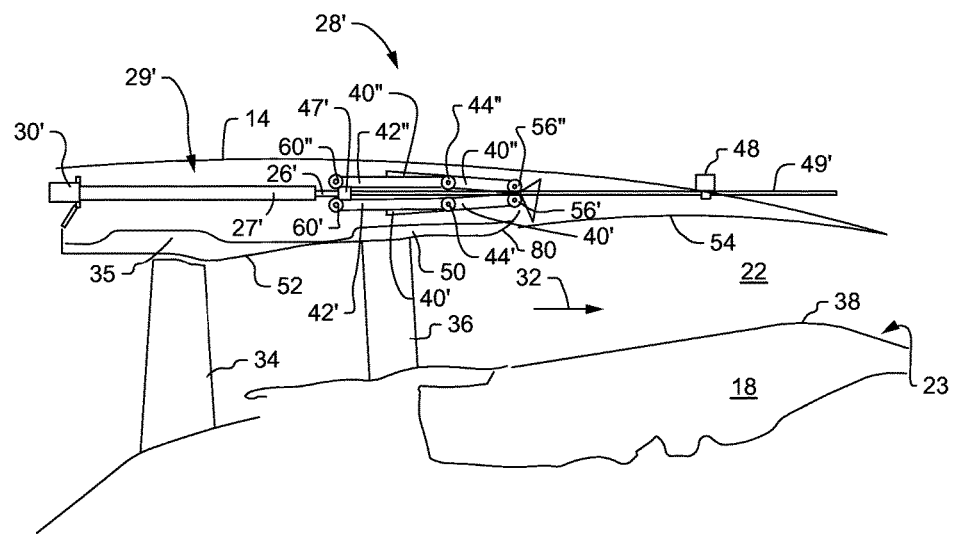
FIG. 7 is a schematic side view of the same alternative embodiment of the disclosed thrust reverser, shown in a stowed position.

Referring now to FIG. 7, as in the first embodiment, it will be apparent that the thrust reverser 28' is also configured so that when in the retracted and stowed position, it is concealed behind the outer wall 50 of the bypass duct 22. However, in this embodiment of the thrust reverser, 28', the actuator system 29' includes an actuator head 30', a base cylinder 27' attached to the actuator head 30', and the single extensible cylinder 26'.

Deployment of the thrust reverser 28' is also achieved in two phases, and includes telescopic extension of the cylinder 26' from the base cylinder 27', wherein during the first phase the blocker doors 40', 40" remain axially oriented, and are caused to remain axially oriented via engagement of the drag linkage brake 47'. The second phase of deployment, includes pivoting of the blocker doors 40', 40" about pivot joints 60' and 60", for extension of the doors into the fan bypass air stream 32. This occurs after the drag linkage brake 47' has been released. Finally, in this embodiment, there are no translating cascade sets 20, as in the first described embodiment of the thrust reverser 28 (see especially FIGS. 2-4).

Those skilled in the art will appreciate that alternative thrust reverser structures as described herein may offer numerous benefits over related art. Not only may a weight penalty be avoided, but the above-described structures may also be configured to substantially reduce excrescence drag. Among additional benefits are reductions in manufacturing complexity, compared to related art thrust reverser assemblies, and avoidance of inherent drag issues associated with related art thrust reverser structures that remain within the fan bypass air stream even while stowed during flight.

Finally, the disclosure may cover numerous embodiments not described herein. For example, specific dimensions of the blocker doors and drag linkages may be tailored and/or adjusted to support various aerodynamically distinct bypass air stream geometries for minimizing excrescence drag coefficients, including those related to skin surface friction, parasitic and separation drag, as well as wave drag. As such, particular forms and shapes of the components may be adjusted to optimize thrust reverser performance characteristics.

What is claimed is:

1. A thrust reverser configured to be positioned in a turbofan engine nacelle extending around an engine core cowl, the nacelle defining an axially extending bypass duct about the engine core cowl for receiving a fan bypass air stream, the thrust reverser comprising:
    a translating sleeve movably coupled to a fixed portion of the nacelle;
    a blocker door pivotally coupled to the translating sleeve such that movement of the translating sleeve in an axially rearward direction causes the blocker door to move aft while remaining in an axial orientation with respect to the translating sleeve, and wherein an outer wall of the bypass duct is radially interposed between the blocker door and a fan bypass air stream when the blocker door is in a stowed position;
    a plurality of translating cascade sets circumferentially arranged about the bypass duct and movably coupled to the fixed portion of the nacelle; and
    a drag linkage pivotally coupled to the blocker door and to one of the plurality of translating cascade sets, wherein the drag linkage pivots about a first pivot joint upon deployment of the blocker door into the fan bypass airstream, the first pivot joint is fixed to the forward end of one of the plurality of translating cascade sets.

2. The thrust reverser of claim 1, wherein a first end of the blocker door is coupled to the translating sleeve at a second pivot joint, the blocker door configured to pivot about the second pivot joint radially inward to a deployed position in which the blocker door is disposed at least partially in the fan bypass air stream.

3. The thrust reverser of claim 2, wherein the drag linkage is coupled to the blocker door at a third pivot joint located at an intermediate location along a length of the blocker door.

4. The thrust reverser of claim 3 further comprising a blocker door brake configured to prevent rotation of the blocker door about the third pivot joint when the blocker door brake is engaged.

5. The thrust reverser of claim 2, wherein upon deployment, angular rotation of the blocker door about the second pivot joint is directionally opposite the angular rotation of the drag linkage about the first pivot joint.

6. The thrust reverser of claim 1, wherein each cascade set of the plurality of translating cascade sets include a plurality of forwardly-directed vanes.

7. The thrust reverser of claim 1, wherein the drag linkage is configured to be concealed within the nacelle body when the blocker door is in the stowed position.

8. The thrust reverser of claim 1, further comprising an actuation system coupled to the translating sleeve, the actuation system including an actuator fixed to the fixed portion of the nacelle and a plurality of hydraulic cylinders driven by the actuator.

9. The thrust reverser of claim 1, wherein:
    the blocker door is one of a pair of blocker doors, each pivotally coupled to the translating sleeve; and
    a first of the pair of blocker doors is pivoted to a deployed position in which the first blocker door is disposed at least partially in the fan bypass air stream and the second of the pair of blocker doors is pivoted in a direction opposite the first blocker door.

10. The thrust reverser of claim 1 further comprising a bullnose at an aft end of the fixed portion of the nacelle, and wherein the blocker door and the drag linkage are positioned forward of the bullnose when the blocker door and the drag linkage are in the stowed position.

11. A method of deploying the thrust reverser of claim 1 for use with a turbofan engine, the method comprising:
    moving the translating sleeve of the thrust reverser axially rearward, wherein movement of the translating sleeve axially rearward causes the blocker door pivotally coupled to the translating sleeve via the first pivot joint to move axially rearward while remaining in the axial orientation; and
    pivoting the blocker door about the first pivot joint to cause the blocker door to pivot from the axial orientation into a deployed orientation.

12. The method of claim 11 further comprising releasing a blocker door brake to allow the blocker door to pivot about the first pivot joint.

13. The method of claim 11, wherein:
    said moving the translating sleeve comprises extending a first hydraulic cylinder to cause the translating sleeve to move axially rearward; and
    said pivoting the blocker door comprising extending a second hydraulic cylinder, the second hydraulic cylinder in a telescoping arrangement with the first hydraulic cylinder.

14. The method of claim 13, wherein said extending the second hydraulic cylinder causes the drag linkage to push on the blocker door at a second pivot joint disposed at an intermediate location between ends of the blocker door.

15. The method of claim 14 further comprising a retraction of the thrust reverser by:
    a) retracting the second hydraulic cylinder to pivot the blocker door from the deployed orientation to the axial orientation,
    b) engaging the blocker door brake; and
    c) releasing the track lock.

16. The method of claim 15, further comprising:
    d) retracting the first hydraulic cylinder to cause the translating sleeve to move axially forward.

17. The method of claim 13 further comprising following extension of the first hydraulic cylinder, engaging a track lock and releasing a blocker door brake.

18. The method of claim 13 further comprising releasing a blocker door brake to allow the blocker door to pivot about the first pivot joint.

* * * * *